United States Patent
Kephart, Jr. et al.

(10) Patent No.: US 9,781,750 B2
(45) Date of Patent: Oct. 3, 2017

(54) AUTOMATIC WIRELESS MODE SWITCHING

(71) Applicant: Laird Technologies, Inc., Earth City, MO (US)

(72) Inventors: Daniel B. Kephart, Jr., Cuyahoga Falls, OH (US); Joseph James Conley, Akron, OH (US); James Martin Kalbfleisch, Cuyahoga Falls, OH (US); Kris A. Sidle, Macedonia, OH (US)

(73) Assignee: Laird Technologies, Inc., Earth City, MO (US)

( * ) Notice: Subject to any disclaimer, the term of this patent is extended or adjusted under 35 U.S.C. 154(b) by 48 days.

(21) Appl. No.: 14/835,202

(22) Filed: Aug. 25, 2015

(65) Prior Publication Data

US 2017/0064745 A1    Mar. 2, 2017

(51) Int. Cl.
*H04B 7/00*    (2006.01)
*H04W 76/02*    (2009.01)
*H04W 4/00*    (2009.01)
*H04W 48/18*    (2009.01)
(Continued)

(52) U.S. Cl.
CPC .......... *H04W 76/02* (2013.01); *H04W 4/008* (2013.01); *H04W 48/18* (2013.01); *H04W 84/18* (2013.01); *H04W 88/10* (2013.01)

(58) Field of Classification Search
CPC ...................................................... H04W 76/02
See application file for complete search history.

(56) References Cited

U.S. PATENT DOCUMENTS

2004/0013128 A1*  1/2004  Moreton ............... H04W 74/02
                                                                370/447
2006/0058059 A1   3/2006  Kim
(Continued)

FOREIGN PATENT DOCUMENTS

WO    WO-2006052214 A1    5/2006

OTHER PUBLICATIONS

International Search Report and Written Opinion for PCT Application No. PCT/US2016/041071 filed Jul. 6, 2016 which claims priority to the instant application, dated Oct. 17, 2016, 9 pages.

*Primary Examiner* — Gerald Smarth
(74) *Attorney, Agent, or Firm* — Harness, Dickey & Pierce, P.L.C.

(57) ABSTRACT

Example embodiments of the present disclosure generally relate to automatic wireless mode switching in wireless communication devices and systems, and methods of automatic wireless mode switching. In one example embodiment, a wireless communication device generally includes a wireless communication interface configured to transmit data to a remote device via wireless communication, and a controller configured to control a mode of operation of the wireless communication device and to automatically switch the mode of operation of the wireless communication device between at least a first mode of operation and a second mode of operation. The first mode of operation is one of a client mode of operation, an access point mode of operation, an ad hoc mode of operation, a dual mode operation and a tri-mode operation. The second mode of operation is one of a dual mode operation and a tri-mode operation.

20 Claims, 8 Drawing Sheets

(51) Int. Cl.
*H04W 88/10* (2009.01)
*H04W 84/18* (2009.01)

(56) References Cited

U.S. PATENT DOCUMENTS

| | | | |
|---|---|---|---|
| 2006/0246946 A1* | 11/2006 | Moritomo | H04L 63/162 455/557 |
| 2007/0254588 A1* | 11/2007 | Lafuente | H04M 1/7253 455/41.2 |
| 2009/0022130 A1 | 1/2009 | Yu et al. | |
| 2011/0269456 A1* | 11/2011 | Krishnaswamy | H04W 8/26 455/426.1 |
| 2012/0135777 A1 | 5/2012 | Karpoor et al. | |
| 2013/0039352 A1 | 2/2013 | Ruster et al. | |
| 2013/0102313 A1* | 4/2013 | Tinnakornsrisuphap | H04W 36/22 455/436 |
| 2013/0182193 A1 | 7/2013 | Shintani et al. | |
| 2013/0273938 A1* | 10/2013 | Ng | H04W 64/00 455/456.1 |
| 2014/0133393 A1* | 5/2014 | Ghosh | H04W 8/26 370/328 |
| 2014/0274179 A1* | 9/2014 | Zhu | H04W 52/243 455/509 |
| 2015/0280657 A1* | 10/2015 | Cheng | H03F 1/3241 375/297 |
| 2016/0373064 A1* | 12/2016 | Lin | H04B 1/0458 |

* cited by examiner

Wireless Mode Switching Examples: Switching Between Client and Other Modes

| Current Mode | New Mode | Example Reasons to Request Switch | Notes on Example New Mode | Potential Purpose for New Mode | Potential WWAN Mode triggered | Potential Bluetooth Mode |
|---|---|---|---|---|---|---|
| Client | AP | - Preferred SSID detected or no longer detected<br>- Location change detected via sensor or GPS<br>- BLE beacon detection or lack of detection<br>- Trigger from other sensors and signals | When enabling AP, the device could configure itself to be the same network configuration as the Preferred SSID or create a new SSID and configuration | Allow other wireless clients to connect to device. | Enable/disable a WWAN device to connect to a WWAN. This could allow a bridge from connected clients to a WWAN device. | Enable/disable a Bluetooth device. This could allow the bridging of Bluetooth or BLE data to connected clients. |
| AP | Client | - Preferred SSID detected or no longer detected<br>- Location change detected via sensor or GPS<br>- BLE beacon detection or lack of detection<br>- Trigger from other sensors and signals<br>- Lack of connected clients | - When enabling client mode, connect to the Preferred SSID.<br>- A slow power down of the transmit power could aid in a smooth roam to the home network for connect clients. | Previously connected clients could roam to new network and device could communicate with devices and services on the home network. | Enable/disable a WWAN device to connect to a WWAN. This could allow a bridge from the connected AP to a WWAN device. | Enable/disable a Bluetooth device. This could allow the bridging of Bluetooth or BLE data to the connected AP. |

FIG. 3

| Current Mode | New Mode | Example Reasons to Request Switch | Notes on Example New Mode | Potential Purpose for New Mode | Potential WWAN Mode triggered | Potential Bluetooth Mode |
|---|---|---|---|---|---|---|
| Client | Ad-hoc | - Preferred SSID detected or no longer detected<br>- Location change detected via sensor or GPS<br>- BLE beacon detection or lack of detection<br>- Trigger from other sensors and signals | For a vehicle application, switching to mode could allow vehicle to vehicle communications to take place via a dedicated short-range communications (DSRC) stack. | Try to connect to a mesh network or other ad hoc devices when not near a reliable home network. | Enable/disable a WWAN device to connect to a WWAN. This could allow a bridge from the ad-hoc network to a WWAN device. | Enable/disable a Bluetooth device. This could allow the bridging of Bluetooth or BLE data to the connected ad-hoc network. |
| Ad-hoc | Client | - Preferred SSID detected or no longer detected<br>- Location change detected via sensor or GPS<br>- BLE beacon detection or lack of detection<br>- Trigger from other sensors and signals | When enabling client mode, connect to the Preferred SSID. | Connect back to reliable home network when back in range of that network. | Enable/disable a WWAN device to connect to a WWAN. This could allow a bridge from the connected home network to a WWAN device. | Enable/disable a Bluetooth device. This could allow the bridging of Bluetooth or BLE data to the connected home network. |

FIG. 3 (continued)

| Current Mode | New Mode | Example Reasons to Request Switch | Notes on Example New Mode | Potential Purpose for New Mode | Potential WWAN Mode triggered | Potential Bluetooth Mode |
|---|---|---|---|---|---|---|
| Client | Dual Mode Client and AP | -Preferred SSID detected or no longer detected; -Location change detected via sensor or GPS; -BLE beacon detection or lack of detection; -Trigger from other sensors and signals | When enabling AP, the device could configure itself to be the same network configuration as the Preferred SSID or create a new SSID and new configuration. | Allow other wireless clients to connect to device. This could be to bridge from connected clients to the connected AP. | -Enable/disable WWAN device to connect to a WWAN. This could allow a bridge from the connected AP and/or the connected clients to a WWAN device. -Could failover to WWAN after out of range of client connected WLAN. | Enable/disable a Bluetooth device. This could allow the bridging of Bluetooth or BLE data to the connected AP and/or to connected clients. |
| Dual Mode Client and AP | Client | -Preferred SSID detected or no longer detected; -Location change detected via sensor or GPS; -BLE beacon detection or lack of detection; -Trigger from other sensors and signals; -Lack of connect clients | -A slow power down of the transmit power could aid in a smooth roam to the home network for connect clients. | After clients have roamed to Preferred SSID, then switch to only client mode to maximize bandwidth to Preferred SSID network. | Enable/disable WWAN device to connect to a WWAN. This could allow a bridge from the connected AP to a WWAN device. | Enable/disable a Bluetooth device. This could allow the bridging of Bluetooth or BLE data to the connected AP |

FIG. 3 (continued)

| Current Mode | New Mode | Example Reasons to Request Switch | Notes on Example New Mode | Potential Purpose for New Mode | Potential WWAN Mode triggered | Potential Bluetooth Mode |
|---|---|---|---|---|---|---|
| Client | Dual Mode Ad-hoc and Client | - Preferred SSID detected or no longer detected<br>- Location change detected via sensor or GPS<br>- BLE beacon detection or lack of detection<br>- Trigger from other sensors and signals | For a vehicle application, switching to mode could allow vehicle to vehicle communications to take place. | Try to connect to a mesh network or other ad hoc devices when not on home network. Bridge ad-hoc network to client network. | Enable/disable a WWAN device to connect to a WWAN. This could allow a bridge from the ad-hoc network and/or connected AP to a WWAN device. | Enable/disable a Bluetooth device. This could allow the bridging of Bluetooth or BLE data to the connected AP and/or to the ad-hoc network. |
| Dual Mode Ad-hoc and Client | Client | - Preferred SSID detected or no longer detected<br>- Location change detected via sensor or GPS<br>- BLE beacon detection or lack of detection<br>- Trigger from other sensors and signals<br>- Lack of other ad-hoc devices<br>- Lack of connected clients | For a vehicle application, switching to mode could happen after the vehicle is turned off and no longer moving. | Switch to only client mode to maximize bandwidth to Preferred SSID network. | Enable/disable a WWAN device to connect to a WWAN. This could allow a bridge from the connected AP to a WWAN device. | Enable/disable a Bluetooth device. This could allow the bridging of Bluetooth or BLE data to the connected AP. |

FIG. 3 (continued)

| Current Mode | New Mode | Example Reasons to Request Switch | Notes on Example New Mode | Potential Purpose for New Mode | Potential WWAN Mode triggered | Potential Bluetooth Mode |
|---|---|---|---|---|---|---|
| Client | Dual Mode AP and Ad-hoc | -Preferred SSID detected or no longer detected<br>-Location change detected via sensor or GPS<br>-BLE beacon detection or lack of detection<br>- Trigger from other sensors and signals | For a vehicle application, switching to mode could allow vehicle to vehicle communications to take place. In addition, allow clients to connect to vehicle systems. | -Try to connect to a mesh network or other ad hoc devices when not on home network.<br>- Allow other wireless clients to connect to device.<br>- Could bridge ad-hoc network to connected clients. | Enable/disable a WWAN device to connect to a WWAN. This could allow a bridge from the ad-hoc network and/or connected clients to a WWAN device. | Enable/disable a Bluetooth device. This could allow the bridging of Bluetooth or BLE data to the connected clients and/or to the ad-hoc network. |
| Dual Mode AP and Ad-hoc | Client | -Preferred SSID detected or no longer detected<br>-Location change detected via sensor or GPS<br>-BLE beacon detection or lack of detection<br>- Trigger from other sensors and signals<br>- Lack of other ad-hoc devices<br>-Lack of connected clients | For a vehicle application, switching to mode could happen after the vehicle is turned off and no longer moving. | Previously connected clients could roam to new network and device could update a service on the home network. | Enable/disable a WWAN device to connect to a WWAN. This could allow a bridge from the connected home network to a WWAN device. | Enable/disable a Bluetooth device. This could allow the bridging of Bluetooth or BLE data to the connected home network. |

FIG. 3 (continued)

| Current Mode | New Mode | Example Reasons to Request Switch | Notes on Example New Mode | Potential Purpose for New Mode | Potential WWAN Mode triggered | Potential Bluetooth Mode |
|---|---|---|---|---|---|---|
| Client | Tri-mode | - Preferred SSID detected or no longer detected<br>- Location change detected via sensor or GPS<br>- BLE beacon detection or lack of detection<br>- Trigger from other sensors and signals | For a vehicle application, switching to mode could allow vehicle to vehicle communications to take place. In addition, allow clients to connect to vehicle systems. WWAN access could be provided by client mode in tri-mode. | - Try to connect to a mesh network or other ad hoc devices when not on home or corporate network.<br>- Allow other wireless clients to connect to device.<br>- Could bridge ad-hoc network to connected clients and/or connected AP.<br>- Could bridge connected AP to connected clients and/or ad-hoc network.<br>- Remain connected to or try connecting to configured SSIDs. | Enable/disable a WWAN device to connect to a WWAN. This could allow a bridge from the ad-hoc network and/or connected clients and/or the connected AP to a WWAN device. | Enable/disable a Bluetooth device. This could allow the bridging of Bluetooth or BLE data to the connected clients and/or and/or connected AP and/or to the ad-hoc network. |
| Tri-mode | Client | - Preferred SSID detected or no longer detected<br>- Location change detected via sensor or GPS<br>- BLE beacon detection or lack of detection<br>- Trigger from other sensors and signals<br>- Lack of other ad-hoc devices<br>- Lack of connected clients | For a vehicle application, switching to mode could happen after the vehicle is turned off and no longer moving. | - Switch to only client mode to maximize bandwidth to Preferred SSID network.<br>- Previously connected clients could roam to new network and device could update a service on the network. | Enable/disable a WWAN device to connect to a WWAN. This could allow a bridge from the connected AP to a WWAN device. | Enable/disable a Bluetooth device. This could allow the bridging of Bluetooth or BLE data to the connected home network. |

FIG. 3 (continued)

AUTOMATIC WIRELESS MODE SWITCHING

FIELD

The present disclosure generally relates to automatic wireless mode switching in wireless communication devices and systems, and methods of automatic wireless mode switching.

BACKGROUND

This section provides background information related to the present disclosure which is not necessarily prior art.

Many wireless enabled systems that switch modes do so based on a user directly configuring wireless information. A device that defaults in access point (AP) mode may expect the user to connect to the device via a wireless computer, smartphone, etc. The user would then open a web page being served from a wireless enabled system or use a custom application that connects to the system. The user would next enter details on how to connect the device to a wireless network infrastructure (e.g., service set identifier (SSID), authentication type, authentication credentials, etc.). Once that information is committed to the wireless enabled system's memory, it would switch to client mode and attempt to connect to the wireless network infrastructure that the user configured. If that fails, the device will typically revert back to AP mode to allow for a new configuration to be entered. To attempt to connect to the wireless network infrastructure again, the user would have to connect to the wireless enabled device and tell it to attempt the client mode connection again or reboot the device. These devices typically offer some kind of network service that a user would potentially want available to multiple devices on the network.

SUMMARY

This section provides a general summary of the disclosure, and is not a comprehensive disclosure of its full scope or all of its features Example embodiments of the present disclosure generally relate to automatic wireless mode switching in wireless communication devices and systems, and methods of automatic wireless mode switching. In one example embodiment, a wireless communication device generally includes a wireless communication interface configured to transmit data to a remote device via wireless communication and to receive data from the remote device via wireless communication, and a controller configured to control a mode of operation of the wireless communication device and to automatically switch the mode of operation of the wireless communication device between at least a first mode of operation and a second mode of operation. The first mode of operation is one of a client mode of operation, an access point mode of operation, an ad hoc mode of operation, a dual mode operation and a tri-mode operation. The second mode of operation is one of a dual mode operation and a tri-mode operation.

In another example embodiment, a wireless communication device generally includes a wireless communication interface configured to transmit data to a remote device via wireless communication and to receive data from the remote device via wireless communication, and a controller configured to control a mode of operation of the wireless communication device and to automatically switch the mode of operation of the wireless communication device between at least a first mode of operation and a second mode of operation. The first mode of operation is one of a client mode of operation, an access point mode of operation, an ad hoc mode of operation, a dual mode operation and a tri-mode operation. The second mode of operation is one of a client mode of operation, an access point mode of operation, an ad hoc mode of operation, a dual mode operation and a tri-mode operation. The controller is configured to switch the mode of operation of the wireless device based on at least one of an external electrical input, an input from another device on a network the wireless communication interface is configured to connect to, an input from a cloud based service, an input from another device connected via a Bluetooth wireless connection, an input from a device connected via a wide area network connection, a location of the wireless communication device, and a quality of service and wireless performance of one or more networks the wireless communication interface is configured to connect to.

According to another example embodiment, a method of controlling operation of a wireless communication device is disclosed. The wireless communication device includes a wireless communication interface configured to transmit data to a remote device via wireless communication and to receive data from the remote device via wireless communication and a controller configured to control a mode of operation of the wireless communication device. The method includes automatically switching, by the controller, the mode of operation of the wireless communication device between at least a first mode of operation and a second mode of operation. The first mode of operation is one of a client mode of operation, an access point mode of operation, an ad hoc mode of operation, a dual mode operation and a tri-mode operation. The second mode of operation is one of a dual mode operation and a tri-mode operation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is an example table of automatic wireless mode switching configurations.

DETAILED DESCRIPTION

Figure 1:
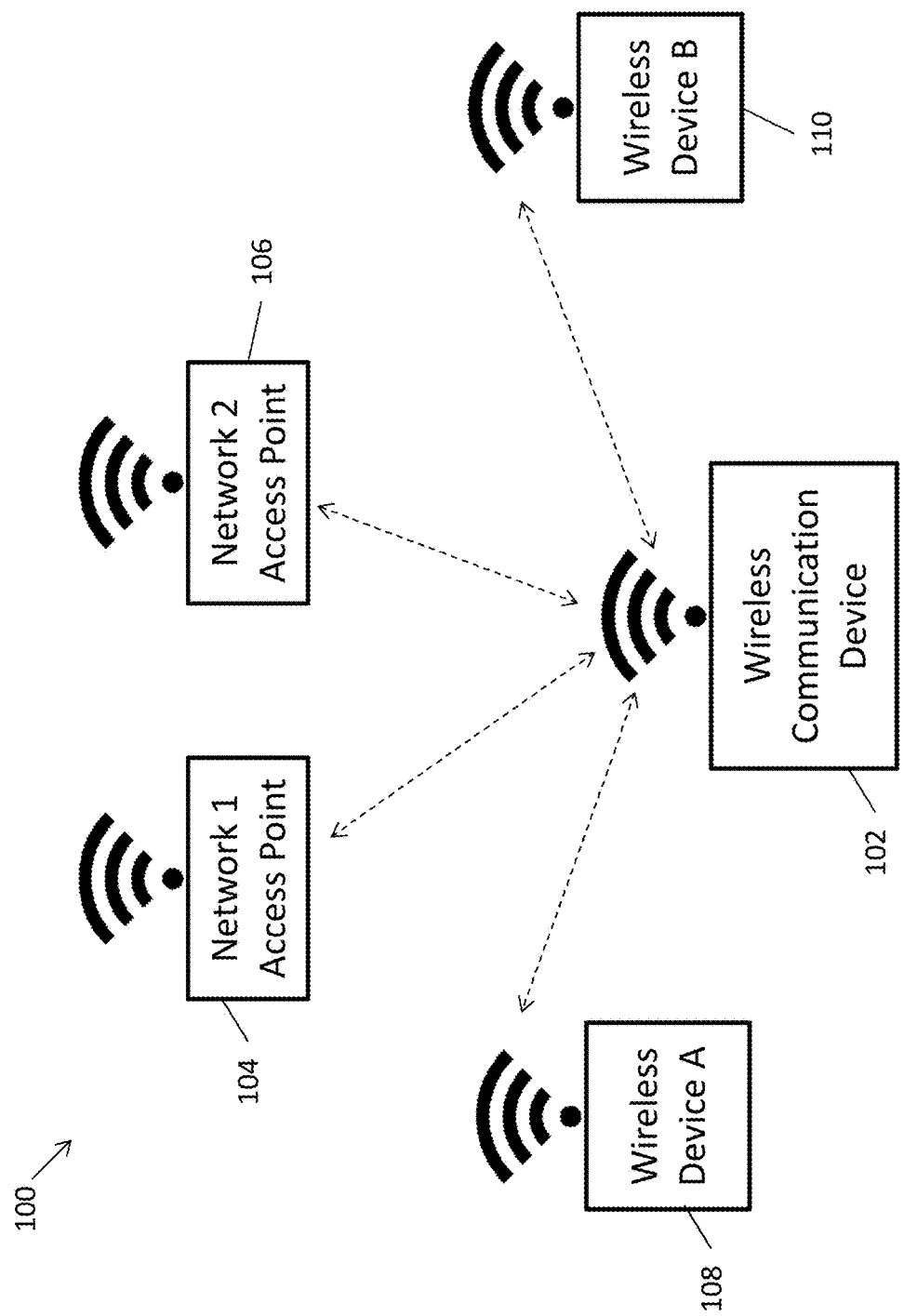
FIG. 1 is a block diagram of an example system for automatic wireless mode switching according to an aspect of the present disclosure.

Example embodiments will now be described more fully with reference to the accompanying drawings.

The inventors herein have recognized that wireless and wirelessly enabled devices typically operate in one mode of operation. These modes of operation include client mode, access point (AP) mode, and ad hoc mode. Wireless and wirelessly enabled devices can operate simultaneously in two of these three typical operating modes. For example, a wireless device could operate in a dual client and access point mode, a dual client and ad hoc mode, or a dual access point and ad hoc mode. Wireless and wirelessly enabled devices could also operate in all three of the typical operating modes at once. For example, a wireless device could operate in client, access point, and ad hoc tri-mode.

A wireless device may be operating in client mode when the device is connecting to another wireless device that is running in access point mode. In client mode, the wireless device may roam to other access points that are configured to be on the same network infrastructure. The client wireless device can then send data to and receive data from the access point that the client wireless device is currently connected to.

A wireless device may be operating in access point (AP) mode when the wireless device is configured to accept connections from other wireless devices that are in client mode. Those client mode devices could then send and receive data that may be destined for services on the access point, or routed out to other network connect type devices connected to the access point.

Access points may be used in infrastructure type networks, but are not used in ad hoc networks. Infrastructure networks are typically centrally controlled or managed to allow many wireless devices to connect to the infrastructure network. These networks can contain one or more APs that use the same network name, network authentication, and network authentication credentials. Example infrastructure networks include home WiFi routers, corporate WiFi work networks, mobile network service provider WiFi networks, etc.

A wireless device may operate in ad hoc mode when the device is configured to connect to other wireless devices in an ad hoc mode. In the ad hoc mode, no wireless access points are required to establish a wireless network. Each device is typically treated as an equal and data packets are dynamically routed through the ad hoc network. Accordingly, in ad hoc mode, any ad hoc wireless device can connect to any other ad hoc device. Ad hoc wireless mode can be used to build wireless mesh networks.

As described above, a wireless device may operate in more than one mode at a time. For example, a wireless device may operate in dual client and access point mode when the device is acting as a client and an AP simultaneously. In this mode, the device may appear to be two different devices (e.g., one device that could service other clients with its AP mode and another device that would be a client to connect to other APs, etc.).

As another example, a wireless device may operate in dual client and ad hoc mode when the device is acting as a client and an ad hoc device simultaneously. In this mode, the device may appear to be two different devices (e.g., one device that would be a client to connect to APs and another device that could connect with ad hoc devices nearby, etc.).

As a further example, a wireless device may operate in dual access point and ad hoc mode when the device is acting as an access point and an ad hoc device simultaneously. In this mode, the device could appear to be two different devices (e.g., one device that would be an AP to accept connections from other client mode devices and another device that could connect with ad hoc devices nearby, etc.).

A device could also operate in all three of the modes at once. A wireless device may operate in tri-mode when the device is acting as an access point, client, and ad hoc device simultaneously. In this mode, the device could appear to be three different wireless devices (e.g., one device that could be an AP to accept connections from other client mode devices, another device that would be a client to connect to other APs, and an ad hoc device to connect with other ad hoc devices, etc.).

A wireless enabled device could operate the dual and/or tri-modes as separate physical wireless interfaces (e.g. two separate physical interfaces in dual mode, three separate physical interfaces in tri-mode, etc.). In some embodiments, the wireless enabled device could operate each mode as a virtual device running on one physical wireless interface.

FIG. 1 illustrates an example system 100 for automatic wireless mode switching. The example system 100 includes a wireless communication device 102. The wireless communication device may be configured to create a wireless connection in a client mode with network access point 104, network access point 106, etc. The wireless communication device 102 may be configured to operate in an AP mode and receive wireless connections from client devices (e.g., wireless device 108, wireless device 110, etc.). The wireless communication device 102 may also be configured to operate in an ad hoc mode (not shown in FIG. 1).

As described above, the wireless communication device 102 may operate in a dual mode in which the wireless communication device 102 simultaneously operates in two different modes. For example, the wireless communication device 102 could operate in a client mode to connect to network access point 104, while simultaneously operating in an AP mode to receive a wireless connection from client wireless device 108. The wireless communication device 102 could also operate in a tri-mode (not shown in FIG. 1).

Figure 2:
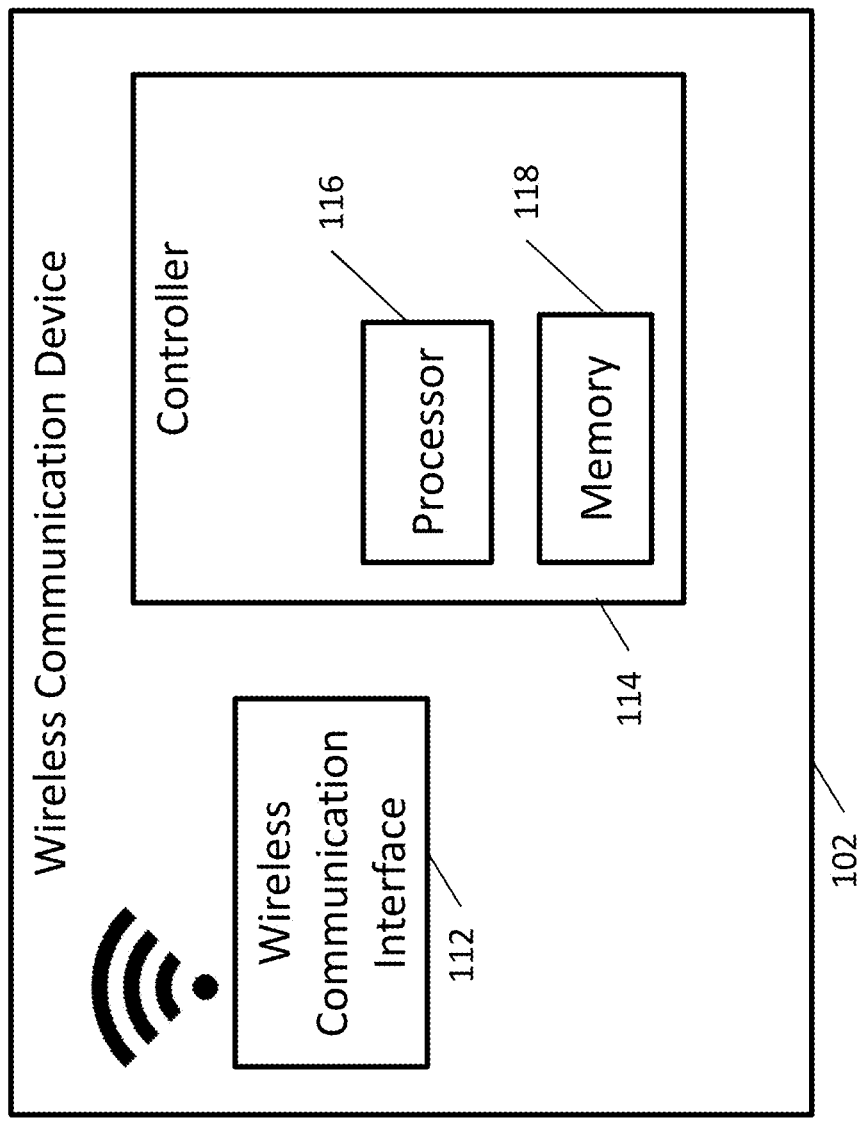
FIG. 2 is a block diagram of the example wireless device of FIG. 1.

FIG. 2 illustrates a block diagram of the example wireless communication device 102. The wireless communication device 102 includes a wireless communication interface 112. The wireless communication interface 112 may be any suitable interface capable of transmitting and/or receiving data via a wireless network. The wireless communication interface 112 may be configured to transmit data to a remote device via wireless communication and to receive data from the remote device via wireless communication.

The wireless communication device 102 may include a controller 114. The controller 114 may include a processor 116 and memory 118. The processor 116 may be any suitable processor capable of executing computer executable instructions (e.g., a microprocessor, microcontroller, etc.). The memory 118 may be any suitable memory capable of storing computer executable instructions.

The controller 114 may be configured to control a mode of operation of the wireless communication device and to automatically switch the mode of operation of the wireless communication device. For example, the controller may switch the mode of operation between a client mode of operation, an access point mode of operation, an ad hoc mode of operation, a dual mode of operation, a tri-mode operation, etc.

The controller 114 may be configured to switch the mode of operation automatically based on any suitable criteria. For example, the controller 114 may switch the mode of operation based on an external electrical input, input from another device on a network the wireless communication device 102 is connected to, an input from a cloud based service, an input from another device connected via a Bluetooth wireless connection, an input from a device connected via a wide area network connection, a location of the wireless communication device 102, a quality of service and wireless performance of a wireless network, etc.

The controller 114 may be configured to establish a connection to a wireless network via a simultaneous client and/or ad hoc mode while also acting as an access point to a user device. The controller 114 may be configured to join a pre-existing wireless network by configuring the wireless communication device 102 to have a same network identification, authentication type, and authentication credentials as the pre-existing wireless network. The controller 114 may be configured to facilitate another device to roam by reducing a transmit power of the wireless communication device interface 112.

The controller 114 may be configured to perform the automatic wireless switching and/or any other methods descried herein using any suitable software and/or hardware techniques. For example, the controller 114 may be configured by storing and executing computer executable instructions, implementing logic circuitry, etc.

Example embodiments described herein allow for a wireless device to scan and detect APs. The wireless device may change states between the single mode operations and the dual mode and tri-mode operations. A wireless enabled system may establish connections to other wireless networks via a simultaneous client and/or ad hoc mode while still acting as an AP to user devices.

When a wireless enabled system is switching to a mode that supports AP mode, the wireless enabled system may effectively become a part of a pre-existing wireless network. The AP mode on the wireless enabled system could configure itself to have the same network ID, authentication type, and authentication credentials as another existing network. Accordingly, user devices could roam between the mode switching wireless enabled system and another more permanent infrastructure network. The wireless device may be able to facilitate a user device to roam to the permanent infrastructure by slowly lowering the transmit power of the wirelessly enabled device. For example, once the transmit power of the wirelessly enabled device is lowered below a threshold, another device coupled to the wirelessly enabled device may roam to a different access point having a stronger signal.

When a wireless enabled system is near a user configured network, it may allow user devices connected to the wireless enabled system to access resources only available on that user configured network.

Example embodiments described herein may allow for inputs from other electrical and computer systems. These inputs may be used in the mode switching logic of the wireless device. Example external inputs could include OBD (on-board diagnostics) data from a vehicle's CAN (controller area network) bus, GPIO (general-purpose input/output) from another computer system that is electrically wired to the wireless enabled system, etc. For example, the OBD data inputs may be used to determine when to switch the mode of operation of the wireless device.

As another example, the automatic switching of the wireless device may be based on input from a device on a network the wireless enabled system is designed to connect to, from a cloud based service on the Internet, from a dual mode or tri-mode connection ad hoc or client connect, etc. Any of these example devices/services could provide input to the wireless device to determine when the wireless device will switch modes of operation.

The wireless device could switch modes of operation based on input from another wireless networking type (e.g., Bluetooth, Bluetooth low energy (BLE), etc.). For example, a Bluetooth device could be connected to the wireless device and provide input over the Bluetooth connection to determine when the wireless device should switch modes of operation.

The wireless device could switch modes of operation based on input from a device connected to the Internet via a wide area network connection (e.g., a cellular modem connected to the wireless enabled system, etc.). For example, a cellular modem could provide input to the wireless device to determine when the wireless device should switch modes of operation.

As another example, the wireless device could switch modes of operation based on a location of the wireless device (e.g., from cellular network triangulation, a GPS device connected to the wireless enabled system, etc.). The wireless device could switch modes of operation when the wireless device crosses a geographical boundary, etc.

The wireless device could switch modes of operation based on quality of service, wireless performance for each wireless connection on the wireless enabled system, etc.

A device with wireless functionality could start out in one mode and switch to another based on different circumstances. For example, a wireless-enabled vehicle may have an embedded wireless device that can operate in two or more modes. Examples of switching between different operating modes are illustrated in FIG. 3, and described below.

A wireless device may automatically switch from a client mode to an AP mode when a preferred SSID is detected or is no longer detected, when a location change is detected via a sensor or GPS, when a BLE beacon is detected or no longer detected, after a trigger from other sensors and signals, etc. When enabling the AP mode, the wireless device could configure itself to have the same network configuration as a preferred SSID, or create a new SSID and configuration. The new AP mode may allow other wireless clients to connect to the wireless device. As an example, the switching may enable/disable a wireless wide area network (WWAN) device to connect to a WWAN. This could allow a bridge from connected clients to a WWAN device. The switching of modes could enable/disable a Bluetooth device. This could allow the bridging of Bluetooth or BLE data to connected clients.

A wireless device may automatically switch from an AP mode to a client mode when a preferred SSID is detected or no longer detected, when a location change is detected via a sensor or GPS, when a BLE beacon is detected or no longer detected, when a trigger is received from other sensors and signals, when a lack of connected clients is detected, etc. When enabling client mode, the wireless device could connect to a preferred SSID. The wireless device could initiate a slow reduction of the transmit power to assist in a smooth roam to a home network for other client devices connected to the wireless device. For example, a home network could be a network that the users of the wireless enabled device will eventually want to roam onto with their user devices. This could be a home WiFi router, a corporate WiFi network, a mobile service providers WiFi network, other trusted infrastructure type networks, etc. Previously connected client devices could roam to a new network and the wireless device could communicate with these other devices and services on the home network. The new client mode may enable/disable a WWAN device to connect to a WWAN. This could allow a bridge from the connected AP to a WWAN device. The new client mode may enable/disable a Bluetooth device. This could allow the bridging of Bluetooth or BLE data to the connected AP.

The wireless device could automatically switch from a client mode to an ad-hoc mode when a preferred SSID is detected or no longer detected, when a location change is detected via sensor or GPS, when a BLE beacon is detected or no longer detected, when a trigger is detected from other sensors and signals, etc. For a vehicle application, switching to ad-hoc mode could allow vehicle to vehicle communications to take place via a dedicated short-range communications (DSRC) stack. The new ad-hoc mode could try to connect to a mesh network or other ad hoc devices when not near a reliable home network. The new ad-hoc mode may enable/disable a WWAN device to connect to a WWAN, which may allow a bridge from the ad-hoc network to a WWAN device. The new ad-hoc mode could enable/disable a Bluetooth device, which may allow the bridging of Bluetooth or BLE data to the connected ad-hoc network.

The wireless device could automatically switch from an ad-hoc mode to a client mode when a preferred SSID is detected or no longer detected, when a location change is detected via sensor or GPS, when a BLE beacon is detected or no longer detected, when a trigger is received from other sensors and signals, etc. When enabling the client mode, the wireless device may connect to a preferred SSID. The new client mode could connect back to a reliable home network when back in range of that network. The new client mode could enable/disable a WWAN device to connect to a WWAN, which may allow a bridge from the connected home network to a WWAN device. The new client mode could enable/disable a Bluetooth device, which may allow the bridging of Bluetooth or BLE data to the connected home network.

The wireless device may automatically switch from a client mode to a dual mode client and AP when a preferred SSID is detected or no longer detected, when a location change is detected via sensor or GPS, when a BLE beacon is detected or no longer detected, when a trigger is received from other sensors and signals, etc. When enabling AP, the wireless device could configure itself to have the same network configuration as a preferred SSID, or create a new SSID and configuration. The new dual mode client and AP may allow other wireless clients to connect to the wireless device. This could allow a bridge from connected clients to the connected AP. The new dual mode client and AP could enable/disable a WWAN device to connect to a WWAN, which could allow a bridge from the connected AP and/or the connected clients to a WWAN device. A device could failover to WWAN after going out of range of a client connected WLAN. The new dual mode client and AP could enable/disable a Bluetooth device, which could allow the bridging of Bluetooth or BLE data to the connected AP and/or to connected clients.

The wireless device could automatically switch from a dual mode client and AP to a client mode when a preferred SSID is detected or no longer detected, when a location change is detected via sensor or GPS, when a BLE beacon is detected or no longer detected, when a trigger is received from other sensors and signals, when a lack of connect clients is detected, etc. A slow reduction of the transmit power could assist in a smooth roam to the home network for connected client devices. After client devices have roamed to a preferred SSID, then the wireless device could switch to only the client mode to maximize bandwidth to the preferred SSID network. The new client mode could enable/disable a WWAN device to connect to a WWAN, which may allow a bridge from the connected AP to a WWAN device. The new client mode could enable/disable a Bluetooth device, which may allow the bridging of Bluetooth or BLE data to the connected AP.

The wireless device could automatically switch from a client mode to a dual mode ad-hoc and client when a preferred SSID is detected or no longer detected, when a location change is detected via sensor or GPS, when a BLE beacon is detected or no longer detected, when a trigger is received from other sensors and/or signals, etc. For a vehicle application, switching to dual mode ad-hoc and client could allow vehicle to vehicle communications to take place. The new dual mode ad-hoc and client could attempt to connect to a mesh network or other ad hoc devices when not on a home network. The new mode could bridge an ad-hoc network to a client network. The new mode could enable/disable a WWAN device to connect to a WWAN, which could allow a bridge from the ad-hoc network and/or connected AP to a WWAN device. The new mode could enable/disable a Bluetooth device, which could allow the bridging of Bluetooth or BLE data to the connected AP and/or to the ad-hoc network.

The wireless device may automatically switch from a dual mode ad-hoc and client mode to a client mode when a preferred SSID is detected or no longer detected, when a location change is detected via a sensor and/or GPS, when a BLE beacon is detected or no longer detected, when a trigger is received from other sensors and signals, when a lack of other ad-hoc devices is detected, when a lack of connected clients is detected, etc. For a vehicle application, switching to client mode could happen after the vehicle is turned off and no longer moving. The wireless device may switch to only client mode to maximize bandwidth to a preferred SSID network. The new client mode may enable/disable a WWAN device to connect to a WWAN, which could allow a bridge from the connected AP to a WWAN device. The new client mode could enable/disable a Bluetooth device, which could allow the bridging of Bluetooth or BLE data to the connected AP.

The wireless device could automatically switch from a client mode to a dual mode AP and ad-hoc when a preferred SSID is detected or no longer detected, when a location change is detected via sensor or GPS, when a BLE beacon is detected or no longer detected, when a trigger is received from other sensors and/or signals, etc. For a vehicle application, switching to dual mode AP and ad-hoc could allow vehicle to vehicle communications to take place. In addition, the new mode may allow clients to connect to vehicle systems. The new dual mode AP and ad-hoc could attempt to connect to a mesh network or other ad hoc devices when not on a home network, allow other wireless clients to connect to the wireless device, could bridge an ad-hoc network to connected clients, etc. The new mode could enable/disable a WWAN device to connect to a WWAN, which could allow a bridge from the ad-hoc network and/or connected clients to a WWAN device. The new mode could enable/disable a Bluetooth device, which could allow the bridging of Bluetooth or BLE data to the connected clients and/or to the ad-hoc network.

The wireless device could automatically switch from a dual mode AP and ad-hoc to a client mode when a preferred SSID is detected or no longer detected, when a location change is detected via sensor or GPS, when a BLE beacon is detected or no longer detected, when a trigger is received from other sensors and/or signals, when a lack of other ad-hoc devices is detected, when a lack of connected clients is detected, etc. For a vehicle application, switching to client mode could happen after the vehicle is turned off and no longer moving. Previously connected client devices could roam to a new network and the wireless device could update a service on the home network. The new client mode may enable/disable a WWAN device to connect to a WWAN, which could allow a bridge from the connected home network to a WWAN device. The new client mode could enable/disable a Bluetooth device, which could allow the bridging of Bluetooth or BLE data to the connected home network.

The wireless device could automatically switch from a client mode to a tri-mode when a preferred SSID is detected or no longer detected, when a location change is detected via sensor or GPS, when a BLE beacon dis detected or no longer detected, when a trigger is received from other sensors and/or signals, etc. For a vehicle application, switching to tri-mode could allow vehicle to vehicle communications to take place. In addition, the new tri-mode could allow clients to connect to vehicle systems. WWAN access could be provided in the new tri-mode. The new tri-mode could also attempt to connect to a mesh network or other ad hoc devices when not on a home or corporate network, allow other wireless clients to connect to the wireless device, could bridge an ad-hoc network to connected clients and/or a connected AP, could bridge a connected AP to connected clients and/or an ad-hoc network, could remain connected to or attempt to connect to configured SSIDs, etc. The new tri-mode could enable/disable a WWAN device to connect to a WWAN, which could allow a bridge from the ad-hoc network and/or connected clients and/or the connected AP to a WWAN device. The new tri-mode could enable/disable a Bluetooth device, which could allow the bridging of Bluetooth or BLE data to the connected clients and/or connected AP and/or to the ad-hoc network.

The wireless mode could automatically switch from a tri-mode to a client mode when a preferred SSID is detected or no longer detected, when a location change is detected via sensor or GPS, when a BLE beacon is detected or no longer detected, when a trigger is received or no longer received, when a lack of other ad-hoc devices is detected, when a lack of connected clients is detected, etc. For a vehicle application, switching to client mode could happen after the vehicle is turned off and no longer moving. The wireless device may switch to only client mode to maximize bandwidth to a preferred SSID network. Previously connected clients could roam to a new network and the wireless device could update a service on the network. The new client mode could enable/disable a WWAN device to connect to a WWAN, which could allow a bridge from the connected AP to a WWAN device. The new client mode could enable/disable a Bluetooth device, which could allow the bridging of Bluetooth or BLE data to the connected home network.

Other examples of automatic mode switching of the wireless device include, but are not limited to, AP mode to dual mode client and AP, dual mode client and AP to AP mode, AP mode to ad-hoc mode, ad-hoc mode to AP mode, AP mode to dual mode ad-hoc and client, dual mode ad-hoc and client to AP mode, AP mode to dual mode AP and ad-hoc, dual mode AP and ad-hoc to AP mode, AP mode to tri-mode, tri-mode to AP mode, ad-hoc mode to dual mode client and AP mode, dual mode client and AP to ad-hoc mode, ad-hoc mode to dual mode ad-hoc and client, dual mode ad-hoc and client to ad-hoc mode, ad-hoc mode to dual mode AP and ad-hoc mode, dual mode AP and ad-hoc to ad-hoc mode, ad-hoc mode to tri-mode, tri-mode to ad-hoc mode, dual mode client and AP to dual mode ad-hoc and client, dual mode ad-hoc and client to dual mode client and AP, dual mode client and AP to dual mode AP and ad-hoc, dual mode AP and ad-hoc to dual mode client and AP, dual mode client and AP to tri-mode, tri-Mode to dual mode client and AP, dual mode ad-hoc and client to dual mode AP and ad-hoc, dual mode AP and ad-hoc to dual mode ad-hoc and client, dual mode ad-hoc and client to tri-mode, and tri-mode to dual mode ad-hoc and client.

When a new mode is triggered, a bridge between two interfaces could be enabled or disabled. All enabled modes could bridge traffic between the interfaces of each enabled mode. This bridge could be a layer 2 bridge, a layer 3 network address translation bridge, other type of bridge, etc.

When a new mode is triggered, a wireless wide area network (WWAN) interface could be enabled or disabled. Traffic in all modes could also be bridged with an enabled WWAN device. This bridge could be a layer 2 bridge, a layer 3 network address translation bridge, other type of bridge, etc.

When a new mode is triggered, a Bluetooth device could be enabled or disabled. Traffic in all modes could also be bridged with an enabled Bluetooth device. This may include bridging any type of Bluetooth traffic to an interface of any of the enabled modes. In addition, bridging between an enabled WWAN device and a Bluetooth device is possible.

When a new mode is triggered and a bridge needs to be switched from one set of interfaces to another, traffic can automatically be sent over the new bridged interfaces. As an example, a wireless device may automatically switch from a dual client and AP mode to an AP mode and enable a WWAN device. In this example, traffic could originally be transmitted over a bridge between the traffic coming in on the interface of the AP mode and the going out on the interface of the client mode, and vice versa. When the new AP only mode is triggered and the WWAN device is enabled, traffic would be bridged from the interface of the AP mode to the interface of the WWAN device.

An example application of automatic wireless mode switching is a vehicle having one physical WiFi adapter with up to two virtual interfaces, a LTE modem (e.g., the WWAN device, etc.), and a Bluetooth adapter having the ability to read BLE beacons and allow other Bluetooth devices to connect to it.

When the vehicle is parked in a garage and the ignition is off, the vehicle would have client mode enabled on the WiFi adapter, the Bluetooth adapter would be enabled, and the LTE modem would be disabled. In the client mode, the vehicle could update a home automation system with vital statistics (e.g., when the vehicle was driven during the day, whether to prompt the vehicle owner that it needs an oil change, etc.). The Bluetooth adapter could be used to determine if the driver is near the vehicle or not. As the driver nears the vehicle, the Bluetooth adapter could detect the driver approaching using Bluetooth scans or BLE beacons from the driver's smartphone. This could trigger the WiFi adapter to enable AP mode on its other virtual interface. The WiFi adapter would then be in dual mode client and AP. Enabling dual mode client and AP could also be done when a driver sits in the vehicle and turns the ignition on. The AP mode on the second virtual interface could configure itself to appear as the driver's home network (e.g., have the same network configuration as the driver's home network, etc.). This would allow the smartphone to roam to the vehicle's WiFi network without having interruptions. The AP mode's interface could be bridged with the client mode's interface that is connected to the home network. Therefore, when the smartphone has roamed to the vehicle, the smartphone can still access internet services and other devices on the home network. Because the Bluetooth adapter is enabled, the user's smartphone could connect to it as well to access services in the vehicle.

Once the driver starts pulling the car out of the garage, the client mode's interface could detect a weakened WiFi signal. It could use this weakened signal detection combined with information about weakening BLE beacons from the home, detection of motion via GPS signal, etc. to determine the vehicle is leaving the home. This information can be used to enable the LTE modem and set up a bridge between the AP mode's interface and the LTE modem's interface. This may allow for routing internet traffic from the driver's smartphone that is connected to the AP mode's interface, so that the driver's smartphone never loses internet connectivity. A connection like a VPN connection to the driver's home network could also be established to maintain a connection to devices on the home network. This may not impede the driver's smartphone from interacting with the vehicle over WiFi. That traffic can still be routed to the car.

Once the smartphone's traffic is routed over the LTE modem, this may trigger a switch from dual mode client and AP to dual AP and ad-hoc mode. The client mode virtual interface could switch to ad-hoc mode. In ad-hoc mode, a DSRC stack could be enabled to provide for vehicle-to-vehicle communications. This may allow for safety applications and other uses.

The vehicle approaching the driver's home could be detected via detection of the driver's home WiFi network via WiFi scan, BLE beacons, GPS location, etc. This could trigger a switch back from dual mode AP and ad-hoc to dual mode client and AP. The client mode could connect to the home network and switch the bridge from the LTE modem to the client mode's interface. This could trigger the LTE modem to disconnect and be disabled. Once the vehicle has stopped and the ignition is turned off near the home, this could trigger a switch from dual mode client and AP to just client mode. If this was done with two physical WiFi interfaces instead of two virtual, the AP mode could slowly reduce transmit power and allow the driver's smartphone to roam to the home network. In the case of one physical interface working as two virtual interfaces, the AP mode would deauthenticate the driver's smartphone and force it to roam to the home network. In client only mode, the vehicle could once again interact with the home network and devices on it.

According to another example embodiment, a method of controlling a wireless communication device includes automatically switching the mode of operation of the wireless communication device between at least a first mode of operation and a second mode of operation. The first mode of operation is one of a client mode of operation, an access point mode of operation, an ad hoc mode of operation, a dual mode operation and a tri-mode operation. The second mode of operation is one of a dual mode operation and a tri-mode operation.

Automatically switching the mode of operation may include switching the mode of operation based on at least one of an external electrical input, an input from another device on a network the wireless communication interface is configured to connect to, an input from a cloud based service, an input from another device connected via a Bluetooth wireless connection, an input from a device connected via a wide area network connection, a location of the wireless communication device, a quality of service and wireless performance of one or more networks the wireless communication interface is configured to connect to, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wireless communication device comprising:
a wireless communication interface configured to transmit data to a remote device via wireless communication and to receive data from the remote device via wireless communication; and
a controller configured to control a mode of operation of the wireless communication device and to automatically switch the mode of operation of the wireless communication device between at least a first mode of operation and a second mode of operation; wherein:
the first mode of operation is one of a client mode of operation, an access point mode of operation, an ad hoc mode of operation, a dual mode operation and a tri-mode operation;
the second mode of operation is one of a dual mode operation and a tri-mode operation; and
the wireless communication interface is configured to join a pre-existing wireless network by configuring the wireless communication interface to have a same network identification, authentication type, and authentication credentials as the pre-existing wireless network to act as an access point to a user device, while simultaneously operating in a client mode to connect to the same pre-existing wireless network.

2. The wireless communication device of claim 1, wherein the controller is configured to switch the mode of operation of the wireless device based on at least one of an external electrical input, an input from another device on a network the wireless communication interface is configured to connect to, an input from a cloud based service, an input from another device connected via a Bluetooth wireless connection, an input from a device connected via a wide area network connection, a location of the wireless communication device, and a quality of service and wireless performance of one or more networks the wireless communication interface is configured to connect to.

3. The wireless communication device of claim 1, wherein the controller is configured to facilitate another device to roam between a wireless connection to the wireless communication device and a wireless connection to an infrastructure network.

4. The wireless communication device of claim 3, wherein the controller is configured to facilitate another device to roam by reducing a transmit power of the wireless communication interface.

5. The wireless communication device of claim 1, wherein the controller is configured to switch the mode of operation between at least three modes of operation.

6. The wireless communication device of claim 5, wherein the controller is configured to switch the mode of operation between at least four modes of operation.

7. The wireless communication device of claim 6, wherein the controller is configured to switch the mode of operation between at least five modes of operation.

8. A vehicle including an embedded wireless communication device of claim 1.

9. A wireless communication device comprising:
a wireless communication interface configured to transmit data to a remote device via wireless communication and to receive data from the remote device via wireless communication; and
a controller configured to control a mode of operation of the wireless communication device and to automatically switch the mode of operation of the wireless communication device between at least a first mode of operation and a second mode of operation; wherein:
the first mode of operation is one of a client mode of operation, an access point mode of operation, an ad hoc mode of operation, a dual mode operation and a tri-mode operation;
the second mode of operation is one of a client mode of operation, an access point mode of operation, an ad hoc mode of operation, a dual mode operation and a tri-mode operation;
the controller is configured to switch the mode of operation of the wireless device based on at least one of an external electrical input, an input from another device on a network the wireless communication interface is configured to connect to, an input from a cloud based service, an input from another device connected via a Bluetooth wireless connection, an input from a device connected via a wide area network connection, a location of the wireless communication device, and a quality of service and wireless performance of one or more networks the wireless communication interface is configured to connect to; and the controller is configured to facilitate a client device to roam between a wireless connection to the wireless communication device and a wireless connection to an access point of an infrastructure network by slowly reducing a transmit power of the wireless communication interface until the client device roams to the access point of the infrastructure network.

10. The wireless communication device of claim 9, wherein the controller is configured to switch the mode of operation based on an external electrical input.

11. The wireless communication device of claim 10, wherein the external electrical input is at least one of on-board diagnostics data from a vehicle controller area network bus and general-purpose input/output data from another device electrically wired to the wireless communication device.

12. The wireless communication device of claim 9, wherein the controller is configured to switch the mode of operation based on at least one of an input from another device on the network the wireless communication interface is configured to connect to and a cloud based service.

13. The wireless communication device of claim 9, wherein the controller is configured to switch the mode of operation based on an input from another device connected to the wireless communication device via a Bluetooth wireless connection and/or a Bluetooth low energy connection.

14. The wireless communication device of claim 9, wherein the controller is configured to switch the mode of operation based on input from a cellular modem connected to the wireless communication device.

15. The wireless communication device of claim 9, wherein the controller is configured to switch the mode of operation based on the location of the wireless communication device as determined via cellular network triangulation and/or a global positioning system device.

16. The wireless communication device of claim 9, wherein the controller is configured to switch the mode of operation based on a quality of service and wireless performance of each network the wireless communication interface is configured to connect to.

17. The wireless communication interface of claim 9, wherein the wireless communication interface is configured to join a pre-existing wireless network by configuring the wireless communication interface to have a same network identification, authentication type, and authentication credentials as the pre-existing wireless network to act as an access point to a user device, while simultaneously operating in a client mode to connect to the same pre-existing wireless network.

18. The method of claim 9, further comprising joining a pre-existing wireless network by configuring the wireless communication interface to have a same network identification, authentication type, and authentication credentials as the pre-existing wireless network to act as an access point to a user device, while simultaneously operating in a client mode to connect to the same pre-existing wireless network.

19. A method of controlling operation of a wireless communication device, the wireless communication device having a wireless communication interface configured to transmit data to a remote device via wireless communication and to receive data from the remote device via wireless communication and a controller configured to control a mode of operation of the wireless communication device, the method comprising:

automatically switching, by the controller, the mode of operation of the wireless communication device between at least a first mode of operation and a second mode of operation; wherein the first mode of operation is one of a client mode of operation, an access point mode of operation, an ad hoc mode of operation, a dual mode operation and a tri-mode operation; and wherein the second mode of operation is one of a dual mode operation and a tri-mode operation; and facilitating a client device to roam between a wireless connection to the wireless communication device and a wireless connection to an access point of an infrastructure network by slowly reducing a transmit power of the wireless communication interface until the client device roams to the access point of the infrastructure network.

20. The method of claim 19, wherein automatically switching the mode of operation includes switching the mode of operation based on at least one of an external electrical input, an input from another device on a network the wireless communication interface is configured to connect to, an input from a cloud based service, an input from another device connected via a Bluetooth wireless connection, an input from a device connected via a wide area network connection, a location of the wireless communication device, and a quality of service and wireless performance of one or more networks the wireless communication interface is configured to connect to.

* * * * *